US009866052B2

(12) United States Patent
Honoki et al.

(10) Patent No.: US 9,866,052 B2
(45) Date of Patent: Jan. 9, 2018

(54) SECONDARY BATTERY CHARGING SYSTEM AND METHOD, AND BATTERY PACK

(71) Applicant: SANYO Electric Co., Ltd., Osaka (JP)

(72) Inventors: Kenichi Honoki, Osaka (JP); Masato Fujikawa, Osaka (JP); Shin-Ichi Yuasa, Kyoto (JP)

(73) Assignee: SANYO ELECTRIC CO., LTD., Osaka (JP)

( * ) Notice: Subject to any disclaimer, the term of this patent is extended or adjusted under 35 U.S.C. 154(b) by 151 days.

(21) Appl. No.: 14/775,699

(22) PCT Filed: Feb. 27, 2014

(86) PCT No.: PCT/JP2014/001071
§ 371 (c)(1),
(2) Date: Sep. 13, 2015

(87) PCT Pub. No.: WO2014/147973
PCT Pub. Date: Sep. 25, 2014

(65) Prior Publication Data
US 2016/0028254 A1 Jan. 28, 2016

(30) Foreign Application Priority Data
Mar. 19, 2013 (JP) .................. 2013-056955

(51) Int. Cl.
H02J 7/04 (2006.01)
H02J 7/16 (2006.01)
(Continued)

(52) U.S. Cl.
CPC ......... H02J 7/007 (2013.01); H01M 10/0525 (2013.01); H01M 10/44 (2013.01);
(Continued)

(58) Field of Classification Search
CPC ............... H01M 10/44; H01M 10/486; H01M 10/4257; H01M 10/443; H01M 10/448;
(Continued)

(56) References Cited

U.S. PATENT DOCUMENTS

2007/0075678 A1* 4/2007 Ng ..................... H02J 7/047
320/106
2008/0224667 A1* 9/2008 Tanaka ................. H01M 10/48
320/139
(Continued)

FOREIGN PATENT DOCUMENTS

JP 2008-228492 9/2008
JP 2008-252960 10/2008
(Continued)

OTHER PUBLICATIONS

International Search Report of PCT application No. PCT/JP2014/001071 dated Apr. 8, 2014.

Primary Examiner — Nghia Doan
(74) Attorney, Agent, or Firm — McDermott Will & Emery LLP

(57) ABSTRACT

Even after the battery reaches the last stage of the end of life, the use can be continued. A charging system includes battery pack and charger. During the charge of lithium-ion secondary battery, charge control unit calculates the full charge capacity maintaining rate, sets a first charge current value on the basis of the full charge capacity maintaining rate, and charges the battery. When lithium-ion secondary battery reaches the last stage of the end of life, charge control unit sets a second charge current value lower than the first charge current value set based on the full charge capacity maintaining rate, and charges the battery.

18 Claims, 5 Drawing Sheets

(51) Int. Cl.

| | |
|---|---|
| *H02J 7/00* | (2006.01) |
| *H01M 10/44* | (2006.01) |
| *H01M 10/0525* | (2010.01) |
| *H01M 10/46* | (2006.01) |
| *H01M 10/48* | (2006.01) |
| *H01M 10/052* | (2010.01) |
| *H01M 10/54* | (2006.01) |

(52) U.S. Cl.
CPC .......... *H01M 10/46* (2013.01); *H01M 10/48* (2013.01); *H02J 7/0052* (2013.01); *H02J 7/04* (2013.01); *H01M 10/052* (2013.01); *H01M 10/54* (2013.01); *Y02W 30/84* (2015.05)

(58) Field of Classification Search
CPC .......... H02J 7/0021; H02J 7/042; H02J 7/007; H02J 2007/005; H02J 7/0047; H02J 7/047; H02J 7/0026; H02J 2007/0098; H02J 7/0081

USPC .................. 320/152, 156–159, 161–165
See application file for complete search history.

(56) References Cited

U.S. PATENT DOCUMENTS

| | | | |
|---|---|---|---|
| 2011/0037439 A1* | 2/2011 | Bhardwaj | H01M 4/13 320/152 |
| 2011/0316487 A1 | 12/2011 | Nakai et al. | |
| 2012/0049804 A1 | 3/2012 | Kobayashi et al. | |
| 2012/0112700 A1* | 5/2012 | Morimoto | H02J 7/0072 320/132 |
| 2013/0335034 A1 | 12/2013 | Suzuki et al. | |

FOREIGN PATENT DOCUMENTS

| | | |
|---|---|---|
| JP | 2012-055092 | 3/2012 |
| WO | 2011/065009 | 6/2011 |
| WO | 2012/127775 | 9/2012 |

* cited by examiner

SECONDARY BATTERY CHARGING SYSTEM AND METHOD, AND BATTERY PACK

This application is a U.S. national stage application of the PCT international application No. PCT/JP2014/001071.

TECHNICAL FIELD

The present invention relates to a charging technology of a lithium-ion secondary battery or the like.

BACKGROUND ART

A non-aqueous electrolyte secondary battery such as a lithium-ion secondary battery has a high energetic density and a characteristic allowing reduction in size and weight of an apparatus. Non-aqueous electrolyte secondary batteries are widely used for main power sources of various electronic apparatuses, power sources for industry or transportation installed in automobiles or airplanes, and main power sources or the like for domestic use.

Normally, in a charge procedure of a non-aqueous electrolyte secondary battery, constant-current charge is performed, and then constant-voltage charge is performed to a full charge state. The charge duration can be reduced by increasing the charge current, but this method increases the charge/discharge cycle degradation of the secondary battery to reduce the service life. While, the charge/discharge cycle degradation can be suppressed by decreasing the charge current, but this method increases the charge duration. In other words, there is a trade-off relationship between the charge duration and charge/discharge cycle degradation with respect to the charge current. For example, when the secondary battery is used as a main driving source in a vehicle or is used as a main power source for domestic use, especially short-term charge is required. However, the short-term charge reduces the service life. When the lithium-ion secondary battery reaches the last stage of the end of life, the available capacity and safety decrease rapidly.

Patent Literature 1 discloses the technology in which the degradation level of a lithium-ion secondary battery is detected, and, when the degradation progresses, full charge is performed at a low set voltage.

Patent Literature 2 discloses the following technology. The actual capacity of a lithium-ion secondary battery is subtracted from the capacity in the brand-new state, the ratio of the subtraction result to the capacity in the brand-new state is calculated as the degradation level. Control is performed so that, as the degradation level increases, at least one of the charge voltage and charge current to be applied to the secondary battery decreases.

CITATION LIST

Patent Literature

PTL 1: Unexamined Japanese Patent Publication No. 2008-228492

PTL 2: Unexamined Japanese Patent Publication No. 2008-252960

SUMMARY OF THE INVENTION

It is useful that the degradation level of a secondary battery is detected and control is performed so that the charge voltage or charge current decreases as the degradation level increases. When the charge voltage or charge current is solely decreased, however, the charge duration becomes long. In other words, when control is performed so that the charge voltage or charge current decreases, the charge duration needs to be taken into consideration.

When the secondary battery reaches the last stage of the end of life, the available capacity (actual capacity) and safety rapidly decrease as discussed above. Therefore, at the last stage of the end of life, a method of stopping the charge and immediately stopping the use of the secondary battery is considered. When the secondary battery is used as an in-vehicle power source or household power source, however, immediate stop of the use of the secondary battery is extremely difficult. It is desired that, even when the secondary battery reaches the last stage of the end of life, the rapid decrease of the available capacity and safety can be suppressed and the use can be continued for a certain time.

The purpose of the present invention is to provide a charging system and method and a battery pack having the following characteristics:

even when the degradation of the secondary battery progresses, a secondary battery can be charged in the shortest charge duration possible; and even after the secondary battery reaches the last stage of the end of life, the use of the secondary battery is continued without being immediately stopped.

The charging system of a secondary battery of the present invention includes the following components:

a secondary battery;

a charger for charging the secondary battery;

a means for sequentially calculating the full charge capacity of the secondary battery;

a means for sequentially calculating the degree of variation from the full charge capacity in the initial state on the basis of the calculated full charge capacity;

a detecting means for detecting that the secondary battery is at the last stage of the end of life; and a charge controlling means for performing the following processes of:

when the secondary battery is not at the last stage of the end of life, setting a first charge current value on the basis of the calculated degree of variation, and charging the secondary battery; and when the secondary battery is at the last stage of the end of life, setting a second charge current value lower than the first charge current value set on the basis of the calculated degree of variation, and charging the secondary battery. In the present invention, the charge current value may be replaced with a charge power value. In other words, the charging system of the secondary battery of the present invention includes the following components:

a secondary battery;

a charger for charging the secondary battery;

a means for sequentially calculating the full charge capacity of the secondary battery;

a means for sequentially calculating the degree of variation from the full charge capacity in the initial state on the basis of the calculated full charge capacity;

a detecting means for detecting that the secondary battery is at the last stage of the end of life; and a charge controlling means for performing the following processes of:

when the secondary battery is not at the last stage of the end of life, setting a first charge power value on the basis of the calculated degree of variation, and charging the secondary battery; and when the secondary battery is at the last stage of the end of life, setting a second charge power value lower than the first charge power value set on the basis of the calculated degree of variation, and charging the secondary battery.

The battery pack of the present invention includes the following components:

a secondary battery;

a means for sequentially calculating the full charge capacity of the secondary battery;

a means for sequentially calculating the degree of variation from the full charge capacity in the initial state on the basis of the calculated full charge capacity;

a detecting means for detecting that the secondary battery is at the last stage of the end of life; and a charge controlling means for outputting a control signal to a charger so as to perform the following processes of:

when the secondary battery is not at the last stage of the end of life, setting a first charge current value on the basis of the calculated degree of variation, and charging the secondary battery; and when the secondary battery is at the last stage of the end of life, setting a second charge current value lower than the first charge current value set on the basis of the calculated degree of variation, and charging the secondary battery. In the present invention, the charge current value may be replaced with a charge power value. In other words, the battery pack of the present invention includes the following components:

a secondary battery;

a means for sequentially calculating the full charge capacity of the secondary battery;

a means for sequentially calculating the degree of variation from the full charge capacity in the initial state on the basis of the calculated full charge capacity;

a detecting means for detecting that the secondary battery is at the last stage of the end of life; and a charge controlling means for outputting a control signal to a charger so as to perform the following processes of:

when the secondary battery is not at the last stage of the end of life, setting a first charge power value on the basis of the calculated degree of variation, and charging the secondary battery; and when the secondary battery is at the last stage of the end of life, setting a second charge power value lower than the first charge power value set on the basis of the calculated degree of variation, and charging the secondary battery.

The charging method of a secondary battery of the present invention includes the following steps of:

sequentially calculating the full charge capacity of the secondary battery;

sequentially calculating the degree of variation from the full charge capacity in the initial state on the basis of the calculated full charge capacity;

detecting that the secondary battery is at the last stage of the end of life; and when the secondary battery is not at the last stage of the end of life, setting a first charge current value on the basis of the calculated degree of variation, and charging the secondary battery, and when the secondary battery is at the last stage of the end of life, setting a second charge current value lower than the first charge current value set on the basis of the calculated degree of variation, and charging the secondary battery. In the present invention, the charge current value may be replaced with a charge power value. In other words, the charging method of the secondary battery of the present invention includes the following steps of:

sequentially calculating the full charge capacity of the secondary battery;

sequentially calculating the degree of variation from the full charge capacity in the initial state on the basis of the calculated full charge capacity;

detecting that the secondary battery is at the last stage of the end of life; and when the secondary battery is not at the last stage of the end of life, setting a first charge power value on the basis of the calculated degree of variation, and charging the secondary battery, and when the secondary battery is at the last stage of the end of life, setting a second charge power value lower than the first charge power value set on the basis of the calculated degree of variation, and charging the secondary battery.

In the present invention, a secondary battery can be charged in the shortest charge duration possible, and, even after the secondary battery reaches the last stage of the end of life, the use thereof can be continued. In other words, in the present invention, the rapid charge can be reconciled with the long service life.

DESCRIPTION OF EMBODIMENTS

An exemplary embodiment of the present invention is described hereinafter with reference to the accompanying drawings while a lithium-ion secondary battery is taken as an example of a non-aqueous electrolyte secondary battery. The present invention is not limited to this.

Figure 1:
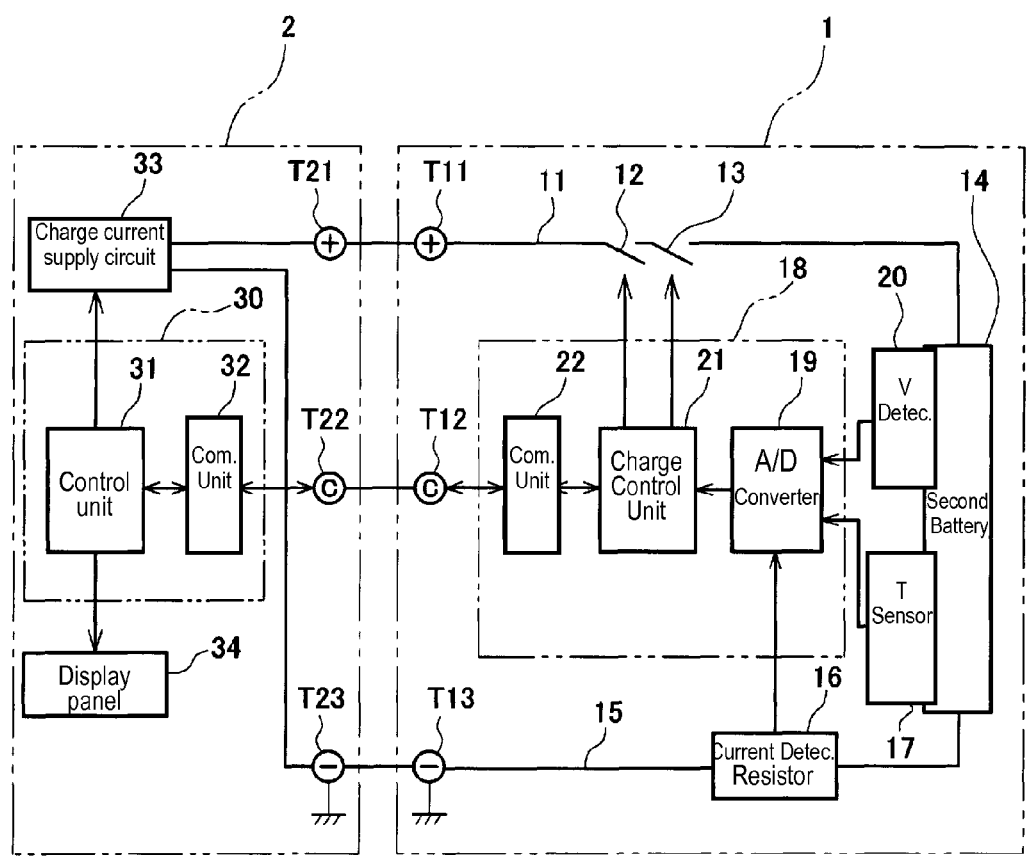
FIG. 1 is a configuration diagram of a charging system in accordance with an exemplary embodiment.

FIG. 1 shows the configuration of a charging system of the lithium-ion secondary battery of the present exemplary embodiment.

The charging system includes battery pack 1 and charger 2 electrically connected to battery pack 1. Positive-side terminal T11 and negative-side terminal T13 of battery pack 1 are connected to positive-side terminal T21 and negative-side terminal T23 of charger 2, respectively. Connector terminal T12 of battery pack 1 is connected to connector terminal T22 of charger 2.

<Battery Pack>

First, the configuration of battery pack 1 is described.

Battery pack 1 includes lithium-ion secondary battery 14 and control IC 18. Lithium-ion secondary battery 14 is formed by interconnecting a plurality of lithium-ion battery cells in series and/or in parallel. Each cell includes a positive-electrode active material, a negative-electrode active material, and a separator. A lithium-containing composite oxide or the like is used as the positive-electrode active material, graphite or the like is used as the negative-electrode active material, and polypropylene and polyethylene are used as the separator.

Temperature sensor 17 is disposed at a predetermined position of lithium-ion secondary battery 14, and detects the temperature of each cell and supplies it to control IC 18.

Voltage detection sensor 20 is disposed at a predetermined position of lithium-ion secondary battery 14, and detects the inter-terminal voltage of each cell and supplies it to control IC 18.

Current detection resistor 16 is connected to the negative-side terminal of lithium-ion secondary battery 14, and detects the flowing current of lithium-ion secondary battery 14 and supplies it to control IC 18.

Control IC 18 includes A/D converter 19, charge control unit 21, and communication unit 22.

A/D converter 19 converts the current data of lithium-ion secondary battery 14, which has been detected by current detection resistor 16, into a digital value, and supplies the digital value to charge control unit 21. A/D converter 19 also converts the temperature data of lithium-ion secondary battery 14, which has been detected by temperature sensor 17, into a digital value, and supplies the digital value to charge control unit 21. A/D converter 19 also converts the voltage data of lithium-ion secondary battery 14, which has been detected by voltage detection sensor 20, into a digital value, and supplies the digital value to charge control unit 21.

Charge control unit 21 calculates an actual capacity (capacity during full charge) of lithium-ion secondary battery 14 on the basis of the current data, voltage data, and temperature data supplied from A/D converter 19. On the basis of the calculated actual capacity and the capacity in the initial state immediately after the product shipment, charge control unit 21 calculates the full charge capacity maintaining rate. In other words, when the capacity during full charge in the initial state is assumed to be $Q0$ and the calculated actual capacity is assumed to be $Q$, full charge capacity maintaining rate=$Q/Q0$ is defined. When the degradation of lithium-ion secondary battery 14 has not progressed, the full charge capacity maintaining rate is 1. When the degradation of lithium-ion secondary battery 14 has progressed, the actual capacity decreases and hence the full charge capacity maintaining rate also sequentially decreases to a value smaller than 1. In other words, during the charge, the lithium in the positive-electrode active material of lithium-ion secondary battery 14 becomes lithium ions, and the lithium ions move into the clearance between the layers of the negative-electrode active material. In the initial state immediately after the product shipment, lithium ions can enter the clearance between the layers of the negative-electrode active material to perform charge. As the charge/discharge cycle progresses, however, the crystal structure of the negative-electrode active material collapses and hence the lithium ions are difficult to enter the clearance between the layers. Therefore, the actual capacity decreases. On the basis of the calculated full charge capacity maintaining rate, charge control unit 21 calculates the charge current value that is demanded to be output from charger 2, and outputs a control signal to charger 2 via communication unit 22.

Furthermore, charge control unit 21 determines whether lithium-ion secondary battery 14 has reached the last stage of the end of life. When it is determined to have reached the last stage of the end of life, charge control unit 21 calculates the charge current value corresponding to this determination, and outputs a control signal to charger 2 via communication unit 22. The determination whether lithium-ion secondary battery 14 has reached the last stage of the end of life is performed on the basis of the degradation speed of the actual capacity, for example.

Therefore, charge control unit 21 outputs two control signals to charger 2. The first control signal is output in the state where the degradation speed of lithium-ion secondary battery 14 is relatively low and lithium-ion secondary battery 14 has not yet reached the last stage of the end of life. The second control signal is output in the state where the degradation speed of lithium-ion secondary battery 14 is relatively high and lithium-ion secondary battery 14 has reached the last stage of the end of life.

Furthermore, upon detecting an abnormality of the system on the basis of the data supplied from A/D converter 19 and the data received from charger 2, charge control unit 21 turns off switch elements 12 and 13 to protect lithium-ion secondary battery 14.

Charge control unit 21 is specifically formed of a microcomputer including a CPU (central processing unit) and a memory. The memory of the microcomputer includes a program memory and a working memory. The program memory stores a program for calculating the actual capacity of lithium-ion secondary battery 14 on the basis of the current data, voltage data, and temperature data, and the other operation programs. The program memory also stores a threshold for determining whether lithium-ion secondary battery 14 has reached the last stage of the end of life.

<Charger>

Next, the configuration of charger 2 is described.

Charger 2 includes control IC 30, charge current supply circuit 33, and display panel 34.

Control IC 30 includes control unit 31 and communication unit 32. Communication unit 32 receives the control signal supplied via communication unit 22 of battery pack 1, and supplies it to control unit 31. Control unit 31 controls charge current supply circuit 33 on the basis of the control signal received via communication unit 32. As necessary, control unit 31 displays the charge state of battery pack 1 on display panel 34. Charge current supply circuit 33 adjusts the increase/decrease of the charge current for charging battery pack 1 on the basis of a signal from control unit 31.

In other words, control unit 31 receives the first control signal and second control signal, which are supplied from charge control unit 21 of battery pack 1, sets a first charge current in response to the first control signal, and sets a second charge current in response to the second control signal. Here, first charge current>second charge current is satisfied. The first charge current is set on the basis of the full charge capacity maintaining rate. The second charge current is also set on the basis of the full charge capacity maintaining rate. In this setting, however, the full charge capacity maintaining rate is decreased by using the lower changed rate in consideration that lithium-ion secondary battery 14 has reached the last stage of the end of life. Therefore, the second charge current is lower than the first charge current that is set on the basis of the full charge capacity maintaining rate.

<Control of Charge Current>

Next, the control method of charge current of the present exemplary embodiment is described in more detail.

Figure 2:
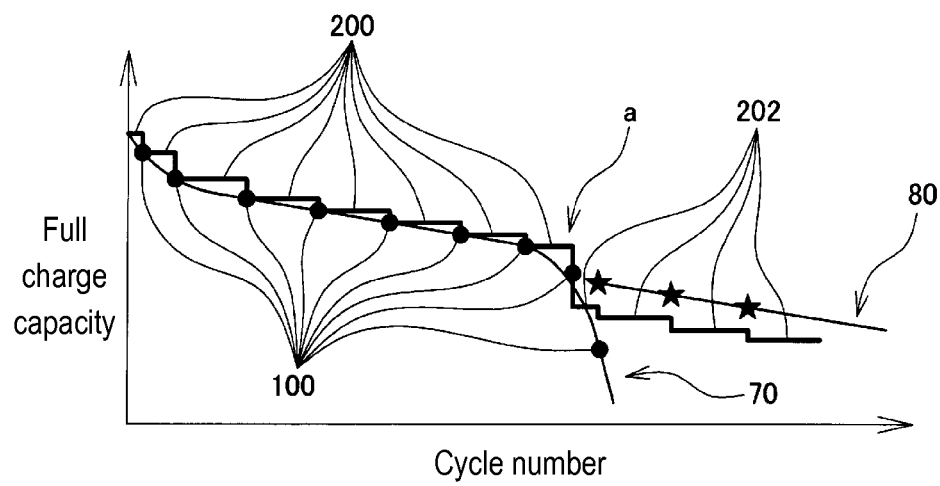
FIG. 2 is a diagram showing the relationship between the charge/discharge cycle number and the full charge capacity.

FIG. 2 shows the relationship between the charge/discharge cycle number and the full charge capacity. The full charge capacity of lithium-ion secondary battery 14 gradually decreases as the charge/discharge cycle progresses. In FIG. 2, graph 70 shows the variation in full charge capacity. In FIG. 2, the full charge capacity rapidly or discontinuously decreases at point (a). At point (a), it is determined that lithium-ion secondary battery 14 has reached the last stage of the end of life.

Charge control unit 21 calculates the full charge capacity of lithium-ion secondary battery 14, namely actual capacity, at a predetermined control timing. In FIG. 2, each black circle 100 shows the sequentially calculated full charge capacity. Solid line 200 varying in a staircase pattern shows the charge current value calculated on the basis of the sequentially calculated full charge capacity. Specifically, charge control unit 21 calculates the full charge capacity maintaining rate on the basis of the calculated full charge capacity and the initial full charge capacity, and calculates the charge current value using the full charge capacity maintaining rate on the basis of $$\text{charge current value} = \text{initial charge current value} \times \text{full charge capacity maintaining rate} \quad (1).$$

The initial charge current value is a charge current value immediately after the product shipment, and hence is a charge current value at a time when degradation has not yet occurred. For charging lithium-ion secondary battery 14, generally, constant-current charge is performed, and then constant-voltage charge is performed, thereby preventing the overvoltage. The charge current value calculated in this manner is a charge current value by constant-current charge. Also in charging lithium-ion secondary battery 14 only by constant-current charge, similar application is allowed.

The charge current value is set correspondingly to the full charge capacity maintaining rate. This means that the charge current value is set at a maximum charge current determined correspondingly to the full charge capacity at that time. In other words, the initial charge current value is set at the highest value possible in order to reduce the charge duration. However, the charge current value calculated after that decreases from the initial charge current value in response to the variation speed of the full charge capacity, and can be considered as a charge current allowing the reduction of the charge duration until arrival at the full charge capacity at that time. Hereinafter, this charge current is referred to as a first charge current.

While, when the charge/discharge cycle progresses, lithium-ion secondary battery 14 reaches the last stage of the end of life at point (a) and the full charge capacity rapidly decreases. When the charge current value is continuously calculated for charge based on equation (1) also after the rapid decrease, the degradation of lithium-ion secondary battery 14 further progresses.

Therefore, when charge control unit 21 detects that lithium-ion secondary battery 14 reaches point (a), charge control unit 21 calculates the charge current value lower than the charge current value calculated based on equation (1). Specifically, charge control unit 21 decreases the full charge capacity maintaining rate using adjusting value α, and calculates the charge current value on the basis of $$\text{charge current value} = \text{initial charge current value} \times (\text{full charge capacity maintaining rate} - \alpha) \quad (2).$$

By modifying equation (2), the following equation is obtained:

$$\text{charge current value} = \text{initial charge current value} \times (\text{full charge capacity maintaining rate} - \alpha) \quad (3)$$

$$= \text{first charge current value} - \text{initial charge current value} \times \alpha.$$

When the charge current calculated based on equation (2) is referred to as a second charge current, the second charge current is a charge current obtained by decreasing the first charge current by a predetermined value. After point (a), lithium-ion secondary battery 14 is charged at the second charge current obtained by such decreasing, that is, the second charge current is set at the lower changed value. This charging suppresses further progression of the degradation of lithium-ion secondary battery 14 having reached the last stage of the end of life, and enables the continuing use.

In FIG. 2, solid line 202 shows the charge current (second charge current) after point (a). Graph 80 shows the variation in full charge capacity when the charge is performed at the second charge current. According to the comparison between graph 70 and graph 80, by setting the charge current after point (a) to be low, rapid decrease in full charge capacity of lithium-ion secondary battery 14 is suppressed.

The second charge current is also calculated in response to the full charge capacity maintaining rate at that time as shown in equation (2) and equation (3). Therefore, the operation in which the second charge current is set low beyond necessity without considering the full charge capacity at that time can be prevented. As a result, the charge duration is not increased beyond necessity. Adjusting value α can be set at any value, but it is preferable that adjusting value α is set at an appropriate value in consideration of the increase of the charge duration. For example, adjusting value α is set at 0.1 or the like.

Figure 3:
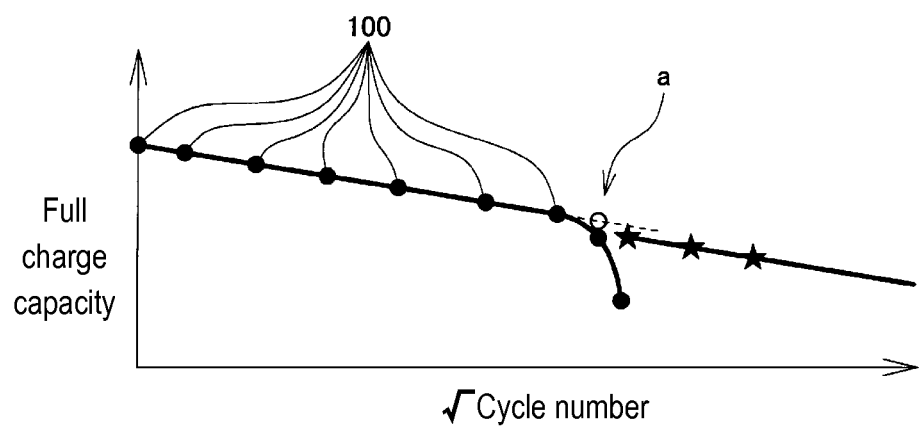
FIG. 3 is a diagram showing the relationship between the square root of the charge/discharge cycle number and the full charge capacity.

FIG. 3 shows the relationship between the square root of the charge/discharge cycle number and the full charge capacity. The full charge capacity of lithium-ion secondary battery 14 decreases substantially linearly with respect to the square root of the charge/discharge cycle number. When lithium-ion secondary battery 14 reaches the last stage of the end of life shown by point (a), the full charge capacity rapidly decreases and deviates from the linear decreasing trend. By detecting such rapid variation in full charge capacity, charge control unit 21 recognizes that lithium-ion secondary battery 14 has reached the last stage of the end of life, and controls the charging by switching the charge current from the first charge current to the second charge current.

Figure 4:
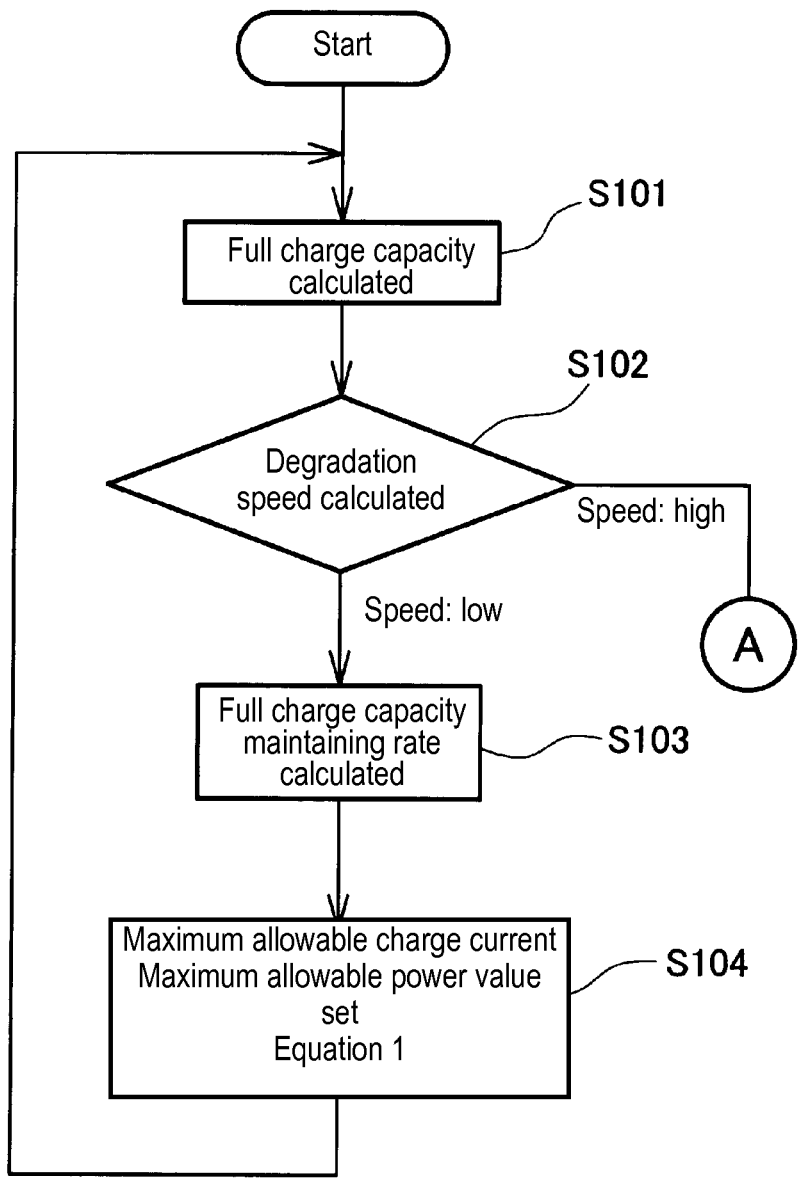
FIG. 4 is a control flowchart (first) in accordance with the exemplary embodiment.
Figure 5:
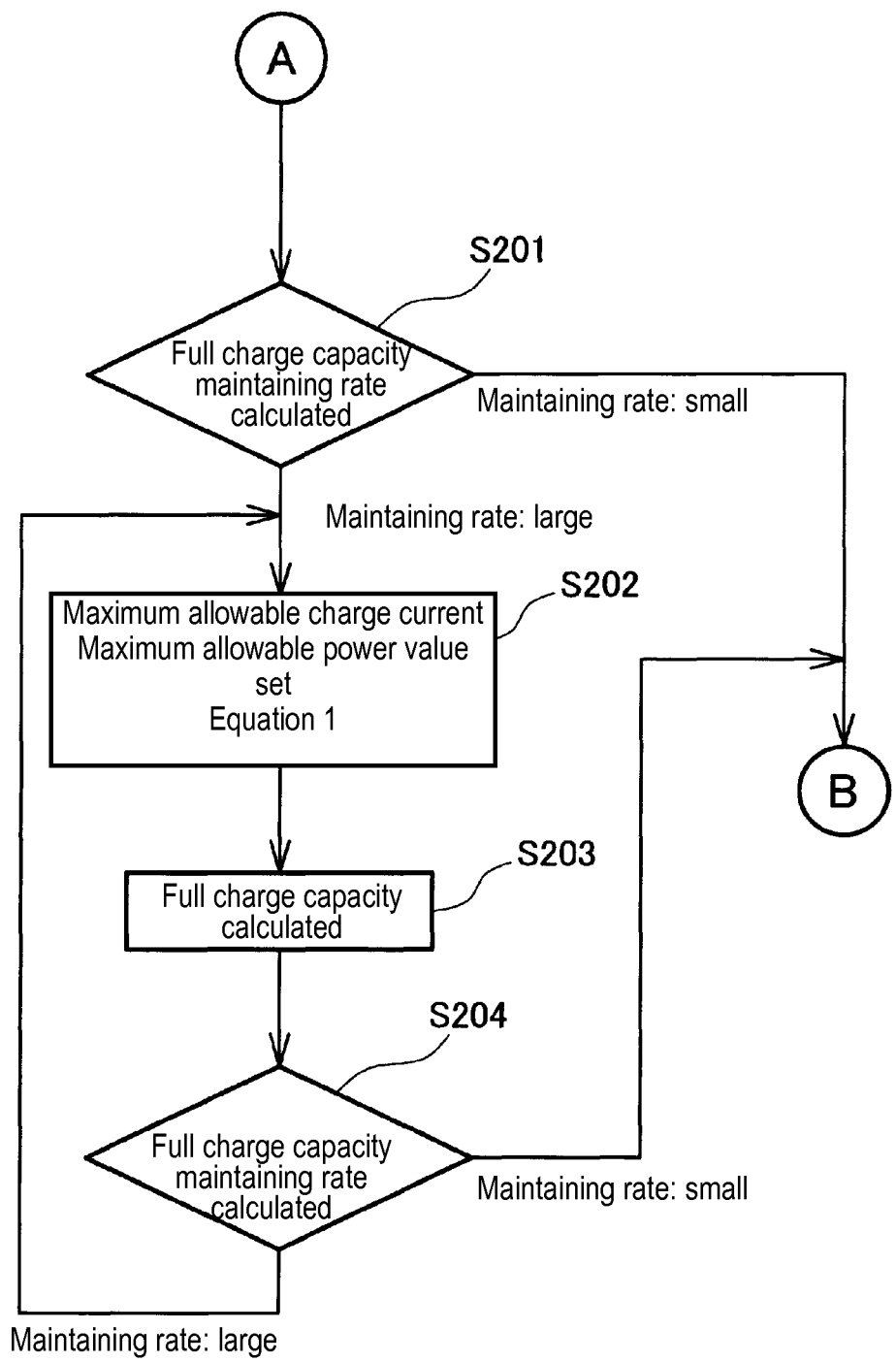
FIG. 5 is a control flowchart (second) in accordance with the exemplary embodiment.
Figure 6:
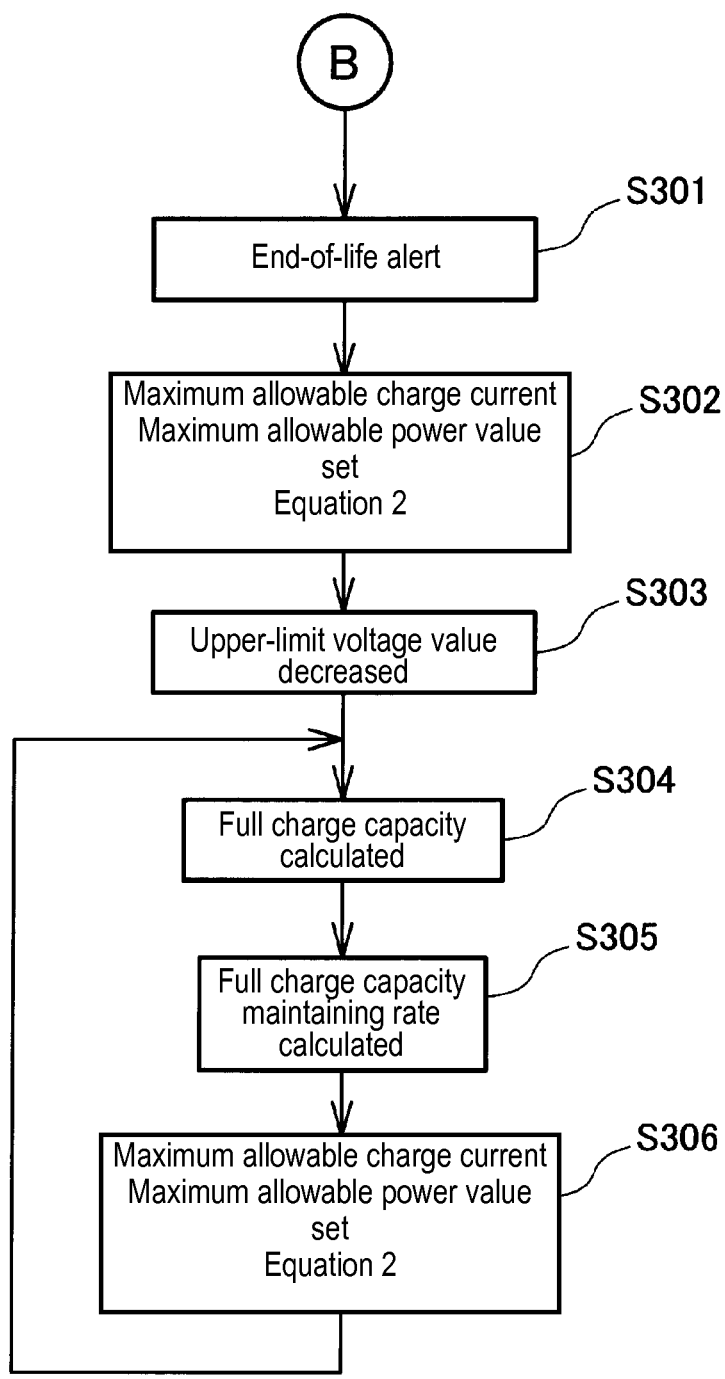
FIG. 6 is a control flowchart (third) in accordance with the exemplary embodiment.

FIG. 4 to FIG. 6 show charge control flowcharts in accordance with the present exemplary embodiment.

First, in FIG. 4, charge control unit 21 calculates the full charge capacity of lithium-ion secondary battery 14 at a predetermined control timing (S101). This calculation of the full charge capacity can be performed using a publicly known method. For example, the full charge capacity can be calculated by integrating the discharge current value during continuous discharge—from the full charge state to the state of a discharge completion voltage.

Next, charge control unit 21 calculates the degradation speed of the full charge capacity (S102). Specifically, charge control unit 21 calculates the difference between the full charge capacity calculated at the present time and the full charge capacity calculated before the present time by one control cycle, and calculates the degradation speed based on v=dQ/dt. Here, dQ is a differential value of the full charge capacity, and dt is a control cycle. Charge control unit 21 compares the calculated degradation speed with a threshold previously stored in the memory, and determines whether the degradation speed is the threshold or lower.

When the degradation speed is the threshold or lower, the degradation speed is regarded to be relatively low, charge control unit 21 calculates the full charge capacity maintaining rate (S103). Then, charge control unit 21 calculates the charge current based on equation (1) using the calculated full charge capacity maintaining rate (S104). This charge current is the first charge current, and is a maximum allowable charge current that allows the reduction of the charge duration as discussed above. The maximum allowable charge current may be called a maximum allowable power value. Charge control unit 21 supplies, to charger 2, a control signal including the calculated first charge current value. Control unit 31 of charger 2 controls charge current supply circuit 33 on the basis of the control signal so that charge current supply circuit 33 adjusts the charge current to the first charge current, supplies the first charge current to battery pack 1, and charges lithium-ion secondary battery 14.

While, when the degradation speed exceeds the threshold, the degradation speed is regarded to be relatively high, the processing shown in FIG. 5 is performed.

In FIG. 5, first, charge control unit 21 calculates the full charge capacity maintaining rate (S201). Then, charge control unit 21 compares the full charge capacity maintaining rate with a threshold previously stored in the memory, and determines whether the full charge capacity is the threshold or less. When the degradation speed is determined to be relatively high in S102 of FIG. 4, generally, lithium-ion secondary battery 14 can be determined to have reached the last stage of the end of life. Sometimes, however, the degradation speed is accidentally and greatly decreased due to some trouble though the battery has not yet reached the last stage of the end of life. Therefore, the determination in S201 is used for distinguishing between the two cases. The threshold of the full charge capacity maintaining rate can be set at 0.3 or the like, for example.

When the full charge capacity maintaining rate exceeds the threshold, it is regarded that the full charge capacity is relatively large and lithium-ion secondary battery 14 has not yet reached the last stage of the end of life. In other words, the degradation speed is regarded to accidentally decrease, and the charge current is calculated based on equation (1) (S202). This charge current is also the first charge current. Charge control unit 21 supplies, to charger 2, a control signal including the calculated first charge current value. Control unit 31 of charger 2 controls charge current supply circuit 33 on the basis of the control signal so that charge current supply circuit 33 adjusts the charge current to the first charge current, supplies the first charge current to battery pack 1, and charges lithium-ion secondary battery 14.

Next, charge control unit 21 calculates the full charge capacity at a predetermined control timing (S203), calculates the full charge capacity maintaining rate again, and compares it with the threshold (S204). When the full charge capacity maintaining rate exceeds the threshold, the accidental decrease in degradation speed is handled by repeating the processes of S202 and later. When the full charge capacity maintaining rate is the threshold or lower, charge control unit 21 determines that lithium-ion secondary battery 14 has reached the last stage of the end of life, outputs a control signal to charger 2, and goes to the processing of FIG. 6.

Also when the full charge capacity maintaining rate is determined to be the threshold or lower in S201, charge control unit 21 determines that lithium-ion secondary battery 14 has reached the last stage of the end of life, outputs a control signal to charger 2, and goes to the processing of FIG. 6.

In FIG. 6, control unit 31 of charger 2 receives the control signal from charge control unit 21, and displays a predetermined end-of-life alert on display panel 34 (S301). For example, this alert means flashing of an LED (light emitting diode), turn on of a red LED, or display of message "end of life". The user can know that lithium-ion secondary battery 14 has reached the last stage of the end of life, by visually recognizing the end-of-life alert of display panel 34. Instead of the display on display panel 34, or together with it, a sound or the like may be uttered.

Next, charge control unit 21 calculates the charge current based on equation (2) using the full charge capacity maintaining rate calculated in S204 of FIG. 5. This charge current is the second charge current, and is lower than the first charge current, that is, the second charge current is set at the lower changed value. Charge control unit 21 supplies, to charger 2, a control signal including the calculated second charge current. Control unit 31 of charger 2 controls charge current supply circuit 33 on the basis of the control signal so that charge current supply circuit 33 adjusts the charge current to the second charge current, supplies the second charge current to battery pack 1, and charges lithium-ion secondary battery 14 (S302).

Next, as necessary, charge control unit 21 decreases the upper-limit voltage value set during charge (S303). Then, charge control unit 21 calculates the full charge capacity at a predetermined control timing again (S304), calculates the full charge capacity maintaining rate (S305), and calculates the charge current based on equation (2) (S306). Charge control unit 21 supplies, to charger 2, a control signal including the calculated second charge current. Control unit 31 of charger 2 controls charge current supply circuit 33 on the basis of the control signal so that charge current supply circuit 33 adjusts the charge current to the second charge current, supplies the second charge current to battery pack 1, and charges lithium-ion secondary battery 14. Since the second charge current is calculated and the charge current is set low by the processing of S302, progression of the degradation can be suppressed and lithium-ion secondary battery 14 can be continuously used even when the battery has reached the last stage of the end of life. By further restricting the upper-limit voltage value in S303, the continuing use of lithium-ion secondary battery 14 can be further certainly secured.

Then, charge control unit 21 repeats processes S304 to S306. For example, when the full charge capacity arrives at a predetermined lower-limit threshold, charge control unit 21 determines that further continuing use is impossible, supplies a control signal to charger 2, and stops the charge. Control unit 31 displays the impossibility for usage on display panel 34 in response to the control signal from charge control unit 21.

As discussed above, in the present exemplary embodiment, charge can be performed in the shortest charge duration possible, and the use can be continued even when lithium-ion secondary battery 14 has reached the last stage of the end of life. In other words, the long service life of lithium-ion secondary battery 14 can be reconciled with the rapid charge. In the present exemplary embodiment, the full charge capacity maintaining rate is sequentially calculated, and the charge current value is sequentially set again using the full charge capacity maintaining rate. Therefore, it is obvious that the present method is essentially different from the conventional constant-current charge. Since the charge current value is set again on the basis of the sequentially calculated full charge capacity maintaining rate, the present method has a function of sequentially adjusting the charge current in response to the full charge capacity at that time, namely a function of self-diagnosing the validity of the charge current. Furthermore, after lithium-ion secondary battery 14 reaches the last stage of the end of life, the charge is performed while the charge current is set at the second charge current. Thus, by performing charge at a specific charge current for emergency evacuation because lithium-ion secondary battery 14 has reached the last stage of the end of life, the use of lithium-ion secondary battery 14 is allowed. In this case, the specific charge current is also sequentially set on the basis of the full charge capacity maintaining rate.

<Another Exemplary Embodiment>

In the present exemplary embodiment, charge current is calculated using equation (1) in S202 of FIG. 5. However, instead of this method, charge current may be calculated using equation (2). In other words, even when the degradation speed accidentally decreases, a second charge current may be calculated using equation (2) similarly to the calculation at the time when lithium-ion secondary battery 14 reaches the last stage of the end of life, and lithium-ion secondary battery 14 may be charged at the second charge current.

When charge current is calculated using equation (2) in S202 of FIG. 5, the degradation speed is compared with the threshold again after S204. When the degradation speed is the threshold or lower, the following method may be employed:

the processing of S104 in FIG. 4 is performed again;

after that, the first charge current is calculated using equation (1) again; and the charge may be performed at the first charge current. That is because, when lithium-ion secondary battery 14 has not yet reached the last stage of the end of life, the charge is performed in consideration of the reduction of the charge duration.

In the present exemplary embodiment, the second charge current is calculated using equation (2). However, the second charge current may be calculated using another equation. For example, using β as an adjusting value, the second charge current may be calculated based on $$\text{second charge current value} = \text{initial charge current value} \times \text{full charge capacity maintaining rate} \times \beta \quad (4).$$

Here, $0<\beta<1$ is satisfied. Similarly, instead of equation (1), another equation may be used to calculate the charge current value. Equation (1) or equation (2) is simply an example, the present invention is not limited to these equations.

In the present exemplary embodiment, when the degradation speed exceeds the threshold and the full charge capacity maintaining rate is the threshold or lower, it is determined that lithium-ion secondary battery 14 has reached the last stage of the end of life. However, when the degradation speed is determined to be high in S102 of FIG. 4, the processing of FIG. 6 can be performed while the processing of FIG. 5 is omitted. In this case, when the degradation speed exceeds the threshold, it is detected that lithium-ion secondary battery 14 has reached the last stage of the end of life.

In the present exemplary embodiment, when the degradation speed exceeds the threshold, the last stage of the end of life is determined. However, when the full charge capacity is the threshold or less, the last stage of the end of life may be determined. "End of life" in the present invention can be generally defined as the timing when the full charge capacity decreases more extremely than usual to disturb the use of lithium-ion secondary battery 14. The last stage of the end of life does not need to be defined as a fixed timing, and may be defined as a timing determined appropriately in accordance with the application of lithium-ion secondary battery 14. For example, the last stage of the end of life is set as the time when the full charge capacity in in-vehicle lithium-ion secondary battery 14 becomes 50% of the initial value immediately after the product shipment.

In the present exemplary embodiment, the full charge capacity is used. Instead of the full charge capacity, the inter-terminal voltage of lithium-ion secondary battery 14 during full charge may be used. In this case, full-charge inter-terminal-voltage maintaining rate is used instead of the full charge capacity maintaining rate. The present invention does not exclude the use of the inter-terminal voltage.

In the present exemplary embodiment, the charge current value is controlled in a control method of charge current. Instead of the charge current value, the charge power value may be used. In this case, the charge power value and initial charge power value are used instead of the charge current value and initial charge current value in equation (1) or equation (2).

The invention claimed is:

1. A charging system of a secondary battery comprising:
a secondary battery;
a charger for charging the secondary battery;
means configured to sequentially calculate a full charge capacity of the secondary battery;
means configured to sequentially calculate a degree of variation from a full charge capacity in an initial state based on the calculated full charge capacity;
detecting means configured to detect that the secondary battery is at an end of life; and
charge controlling means configured to:
when the secondary battery is not at the last stage of the end of life, set a first charge current value or a first charge power value based on the degree of variation calculated when the secondary battery is not at the last stage of the end of life, and charge the secondary battery using the first charge current value or the first charge power value, and
when the secondary battery is at the last stage of the end of life, set a second charge current value lower than the first charge current value based on the degree of variation calculated when the secondary battery is at the last stage of the end of life or a second charge power value lower than the first charge power value based on the degree of variation calculated when the secondary battery using the second charge current value or the second charge power value is at the last stage of the end of life, and charge the secondary battery.

2. The charging system of the secondary battery according to claim 1, wherein the charge controlling means
sets the first charge current value or the first charge power value based on the degree of variation and an initial charge current value or an initial charge power value in the initial state of the secondary battery, and
sets the second charge current value or the second charge power value based on the degree of variation, an adjusting value, and the initial charge current value or the initial charge power value in the initial state of the secondary battery.

3. The charging system of the secondary battery according to claim 2, wherein the charge controlling means
    calculates, as the degree of variation, a ratio of the calculated full charge capacity to the full charge capacity in the initial state,
    sets the first charge current value or the first charge power value based on the ratio and the initial charge current value or the initial charge power value in the initial state of the secondary battery, and
    sets the second charge current value or the second charge power value based on the ratio, the adjusting value, and the initial charge current value or the initial charge power value in the initial state of the secondary battery.

4. The charging system of the secondary battery according to claim 1, wherein
    when the secondary battery is at the last stage of the end of life, the charge controlling means decreases an upper-limit voltage value during charge and charges the secondary battery.

5. The charging system of the secondary battery according to claim 1, wherein
    the detecting means performs detection by comparing a variation speed of the calculated full charge capacity with a predetermined threshold.

6. The charging system of the secondary battery according to claim 5, wherein
    the detecting means performs detection by comparing the variation speed of the calculated full charge capacity with the predetermined threshold and by comparing the degree of variation with a predetermined threshold.

7. The charging system of the secondary battery according to claim 5, wherein the charge controlling means
    when the variation speed is higher than the predetermined threshold, sets the second charge current value or the second charge power value and charges the secondary battery, and then
    when the variation speed becomes the predetermined threshold or lower, sets the first charge current value or the first charge power value again and charges the secondary battery.

8. The charging system of the secondary battery according to claim 1, further comprising
    displaying means configured to display a predetermined alert when the detecting means detects the last stage of the end of life of the secondary battery.

9. A battery pack comprising:
    a secondary battery;
    means configured to sequentially calculate a full charge capacity of the secondary battery;
    means configured to sequentially calculate a degree of variation from a full charge capacity in an initial state based on the calculated full charge capacity;
    detecting means configured to detect that the secondary battery is at an end of life; and
    charge controlling means configured to output a control signal to a charger so as to:
        when the secondary battery is not at the last stage of the end of life, set a first charge current value or a first charge power value based on the degree of variation calculated when the secondary battery is not at the last stage of the end of life, and charge the secondary battery using the first charge current value or the first charge power value, and
        when the secondary battery is at the last stage of the end of life, set a second charge current value lower than the first charge current value based on the degree of variation calculated when the secondary battery using the second charge current value or the second charge power value is at the last stage of the end of life or a second charge power value lower than the first charge power value based on the degree of variation calculated when the secondary battery is at the last stage of the end of life, and charge the secondary battery.

10. The battery pack according to claim 9, wherein
    the charge controlling means
        sets the first charge current value or the first charge power value based on the degree of variation and an initial charge current value or an initial charge power value in the initial state of the secondary battery, and
        sets the second charge current value or the second charge power value based on the degree of variation, an adjusting value, and the initial charge current value or the initial charge power value in the initial state of the secondary battery.

11. The battery pack according to claim 10, wherein
    the charge controlling means
        calculates, as the degree of variation, a ratio of the calculated full charge capacity to the full charge capacity in the initial state,
        sets the first charge current value or the first charge power value based on the ratio and the initial charge current value or the initial charge power value in the initial state of the secondary battery, and
        sets the second charge current value or the second charge power value based on the ratio, the adjusting value, and the initial charge current value or the initial charge power value in the initial state of the secondary battery.

12. The battery pack according to claim 9, wherein
    when the secondary battery is at the last stage of the end of life, the charge controlling means decreases an upper-limit voltage value during charge.

13. The battery pack according to claim 9, wherein
    the detecting means performs detection by comparing a variation speed of the calculated full charge capacity with a predetermined threshold.

14. The battery pack according to claim 13, wherein
    the detecting means performs detection by comparing the variation speed of the calculated full charge capacity with the predetermined threshold and by comparing the degree of variation with a predetermined threshold.

15. The battery pack according to claim 13, wherein
    the charge controlling means
        when the variation speed is higher than the predetermined threshold, sets the second charge current value or the second charge power value, and then
        when the variation speed becomes the predetermined threshold or lower, sets the first charge current value or the first charge power value again.

16. The battery pack according to claim 9, further comprising
    means configured to output a signal indicating an alert when the detecting means detects the last stage of the end of life of the secondary battery.

17. A charging method of a secondary battery comprising:
    sequentially calculating a full charge capacity of the secondary battery;
    sequentially calculating a degree of variation from a full charge capacity in an initial state based on the calculated full charge capacity;
    detecting that the secondary battery is at an end of life; and when the secondary battery is not at the last stage of the end of life, setting a first charge current value or a first charge power value based on the degree of variation calculated when the secondary battery is not at the last stage of the end of life, and charging the secondary battery using the first charge current value or the first charge power value, and when the secondary battery is at the last stage of the end of life, setting a second charge current value lower than the first charge current value based on the degree of variation calculated when the secondary battery is at the last stage of the end of life or a second charge power value lower than the first charge power value based on the degree of variation calculated when the secondary battery using the second charge current value or the second charge power value is at the last stage of the end of life, and charging the secondary battery.

18. The charging method of the secondary battery according to claim 17, wherein the first charge current value or the first charge power value is set based on the degree of variation and an initial charge current value or an initial charge power value in the initial state of the secondary battery, and the second charge current value or the second charge power value is set based on the degree of variation, an adjusting value, and the initial charge current value or the initial charge power value in the initial state of the secondary battery.

* * * * *